(12) United States Patent
Lilja

(10) Patent No.: US 6,631,268 B1
(45) Date of Patent: Oct. 7, 2003

(54) DATA TRANSMISSION METHOD AND RADIO SYSTEM

(75) Inventor: Harri Lilja, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/342,480

(22) Filed: Jun. 29, 1999

(30) Foreign Application Priority Data

Jul. 1, 1998 (FI) .................................................. 981518

(51) Int. Cl.[7] .......................... H04B 1/10; H04B 15/00; H04B 17/00; H04Q 7/20
(52) U.S. Cl. ...................... 455/450; 455/446; 455/453; 455/67.3; 455/125; 455/63; 455/115
(58) Field of Search ................... 455/446, 447, 455/450, 453, 62, 63, 67.1, 67.3, 108, 115, 127, 452, 435–438, 500, 501, 509–513, 403, 422

(56) References Cited

U.S. PATENT DOCUMENTS

| | | | |
|---|---|---|---|
| 4,973,923 A | 11/1990 | Kuisma | 332/117 |
| 5,091,919 A | 2/1992 | Kuisma | 375/60 |
| 5,123,031 A | 6/1992 | Kuisma | 375/60 |
| 5,124,672 A | 6/1992 | Kuisma | 332/103 |
| 5,231,364 A | 7/1993 | Mucke | 332/105 |
| 5,257,257 A | 10/1993 | Chen et al. | 370/18 |
| 5,311,151 A | 5/1994 | Vaisanen | 332/105 |
| 5,357,221 A | 10/1994 | Matero | 332/123 |
| 5,371,481 A | 12/1994 | Tiittanen et al. | 332/103 |
| 5,392,460 A | 2/1995 | Mattila et al. | 455/76 |
| 5,394,391 A | 2/1995 | Chen et al. | 370/18 |
| 5,406,593 A * | 4/1995 | Chennakeshu et al. | 331/1 R |
| 5,416,435 A | 5/1995 | Jokinen et al. | 327/113 |
| 5,420,889 A | 5/1995 | Juntti | 375/346 |
| 5,426,395 A * | 6/1995 | Cygan | 330/207 P |
| 5,426,670 A | 6/1995 | Leppanen et al. | 375/343 |
| 5,440,597 A | 8/1995 | Chung et al. | 375/200 |
| 5,446,422 A | 8/1995 | Mattila et al. | 332/103 |
| 5,469,126 A | 11/1995 | Murtojarvi | 332/105 |
| 5,491,718 A | 2/1996 | Gould et al. | 375/205 |
| 5,533,013 A | 7/1996 | Leppanen | 370/18 |
| 5,548,616 A | 8/1996 | Mucke et al. | 375/295 |
| 5,550,893 A | 8/1996 | Heidari | 379/59 |
| 5,566,201 A | 10/1996 | Ostman | 375/200 |
| 5,589,795 A | 12/1996 | Latvo-Aho | 327/553 |
| 5,590,160 A | 12/1996 | Ostman | 375/367 |
| 5,596,571 A | 1/1997 | Gould et al. | 370/335 |
| 5,628,052 A * | 5/1997 | DeSantis et al. | 370/334 |
| 5,654,980 A | 8/1997 | Latva-aho et al. | 375/208 |
| 5,666,651 A * | 9/1997 | Wang | 455/450 |
| 5,678,224 A | 10/1997 | Murtojarvi | 455/326 |
| 5,703,873 A | 12/1997 | Ojanpera et al. | 370/332 |
| 5,708,969 A * | 1/1998 | Kotzin et al. | 455/423 |
| 5,715,279 A | 2/1998 | Laakso et al. | 375/224 |
| 5,731,772 A | 3/1998 | Mikkola et al. | 341/118 |

(List continued on next page.)

FOREIGN PATENT DOCUMENTS

| | | |
|---|---|---|
| DE | 43 03 999 A1 | 8/1994 |
| EP | 265 178 | 4/1988 |
| WO | WO 90/10342 | 9/1990 |

OTHER PUBLICATIONS

Finnish Official Action.

Primary Examiner—Nay Maung
Assistant Examiner—Edan Orgad
(74) Attorney, Agent, or Firm—Perman & Green, LLP (57) ABSTRACT

The invention relates to a data transmission method and a radio system, which comprises a plurality of transceivers (100, 108 to 112) that are arranged to intercommunicate by using a plurality of predetermined radio frequency channels, and in which radio system a maximum value is determined for the amount of interference caused to adjacent frequency channels by the transmitter. In the solution in accordance with the invention, for reducing the power consumption of the transmitters, the transceivers of the system are arranged to transmit on different radio frequency channels, using different maximum values of adjacent channel interference.

30 Claims, 6 Drawing Sheets

U.S. PATENT DOCUMENTS

| | | | |
|---|---|---|---|
| 5,754,541 A | * 5/1998 | Glisic et al. | 370/335 |
| 5,787,362 A | 7/1998 | Matero | 455/553 |
| 5,794,159 A | 8/1998 | Portin | 455/53 |
| 5,815,801 A | 9/1998 | Hamalainen | 455/63 |
| 5,839,074 A | * 11/1998 | Plehn | 455/450 |
| 5,852,603 A | 12/1998 | Lehtinen et al. | 370/280 |
| 5,881,097 A | 3/1999 | Lilleberg et al. | 375/203 |
| 5,887,252 A | 3/1999 | Noneman | 455/414 |
| 5,896,562 A | 4/1999 | Heinonen | 455/76 |
| 5,905,946 A | 5/1999 | Lilleberg et al. | 455/63 |
| 6,175,279 B1 | * 1/2001 | Ciccarelli et al. | 330/285 |
| 6,295,279 B1 | * 9/2001 | Lin | 370/252 |
| 6,353,359 B1 | * 3/2002 | Leizerovich | 330/129 |

* cited by examiner

DATA TRANSMISSION METHOD AND RADIO SYSTEM

FIELD OF THE INVENTION

The invention relates to a radio system, which comprises a plurality of transceivers that are arranged to communicate with each other by using a plurality of predetermined radio frequency channels. In particular, the invention relates to a system in which a maximum value is determined for the amount of interference caused to adjacent frequency channels by the transceiver frequency channel.

BACKGROUND OF THE INVENTION

In radio systems the signal to be transmitted must in general be modulated for transmission on a transmission channel. Generally, digital modulation methods are applied, by means of which the desired signal is transmitted on an allocated frequency channel. Digital modulation methods whose envelope is not constant are often employed. When employing these modulation methods, in case the transmitter is not linear, interference, which is called adjacent channel interference, is caused outside the frequency channel allocated to the signal transmission. This interference is thus mainly due to nonlinearity of the transmitter. The nonlinearity of the transmitter is closely related to the efficiency of the terminal amplifier of the transmitter. Linear amplifiers cause little interference to adjacent frequency channels, but their efficiency is poor. More nonlinear amplifiers cause more interference, whereas the efficiency is better.

In radio systems, a maximum value is in general determined for the amount of interference caused to the adjacent channels by transmitters, the purpose of which value is to enable the simultaneous use of adjacent channels for telecommunications without excessive interference. The maximum value is generally determined by simulations at the planning stage of the system. By simulating traffic on different channels and by measuring interchannel interference and transmission errors resulting therefrom, an acceptable maximum value of interference is determined.

In current systems, the maximum value of adjacent channel interference is determined to be the same within the whole system. On the basis of simulations, the value which gives a satisfactory result in the whole system, is selected. However, this method has several drawbacks. Since the whole system employs one interference value, the value has to be selected on the basis of the channel that is the most sensitive to interference. So on all frequency channels, transmitters must meet the same requirement. Consequently, in practice amplifiers that are linear but poor in efficiency must be used on all frequency channels. This causes problems, for instance power consumption of mobile telephones is high due to inefficient amplifiers.

BRIEF DESCRIPTION OF THE INVENTION

The object of the invention is to provide a method and a system to the effect that the above-mentioned problems can be solved. This is achieved with a transmission method in which at least one base station transceiver and terminal transceivers communicate by employing a plurality of predetermined radio frequency channels and in which method a maximum value is determined for the amount of interference caused to adjacent frequency channels by the transmitter frequency channel. The invention is characterized in that different maximum values are determined for different radio frequency channels.

The invention also relates to a radio system which comprises a plurality of transceivers that are arranged to intercommunicate by employing a plurality of predetermined frequency channels and in which radio system a maximum value is determined for the amount of interference caused to adjacent frequency channels by the transmitter. The system of the invention is characterized in that the transceivers of the system are arranged to transmit on different frequency channels using different maximum values of adjacent channel interference.

The preferred embodiments of the invention are disclosed in the dependent claims.

Several advantages are achieved with the method and system of the invention. The invention is based on the fact that, in radio systems, there are in general frequency channels whose tolerance of interference is different. For instance, the outermost frequency channels of a frequency range allocated to a system may have stricter interference requirements than the channels in the centre of the range. By means of the invention, requirements as strict as necessary can be set to the outer channels, while higher adjacent channel interference is allowed to the centre channels. This has an advantage that the centre channels may employ more nonlinear amplifiers whose power consumption is lower, on the average.

In one preferred embodiment of the invention, the maximum interference limits to different frequency channels can be set at the planning stage of the system, whereby they are fixed values that are not varied. The interference limits can also be changed, for instance, in connection with network planning modifications. In a second preferred embodiment of the invention, the values of interference limits can be changed dynamically by using, for instance, the traffic load of network channels as an adjustment criterion.

In a preferred embodiment of the invention, a base station is arranged to signal information to a terminal on the maximum value of interference allowed on the terminal frequency channel. Information on the maximum interference level can be transmitted to the terminal every time a call is established. This is particularly applicable to the embodiment in which the values are varied dynamically. Another advantage is that the terminal need not keep the values of different channels in the memory all the time. In a second preferred embodiment, information on the maximum interference level can be transmitted to the terminal every time the terminal registers in the network. This is advantageous particularly in cases where the values do not constantly vary.

In one preferred embodiment of the invention, adjacent channel interference caused by transmitters is controlled by limiting the transmitter's maximum power.

In a second preferred embodiment of the invention, adjacent channel interference caused by transmitters is controlled by adjusting the linearity of transmitters by means of biasing.

In a third preferred embodiment of the invention, the above-mentioned options are applied simultaneously.

In a fourth preferred embodiment of the invention, adjacent channel interference caused by transmitters is controlled by predistorting transmitters.

BRIEF DESCRIPTION OF THE DRAWINGS

In the following the invention will be described in greater detail in connection with preferred embodiments, with reference to the attached drawings, in which.

DETAILED DESCRIPTION OF THE INVENTION

Figure 1:
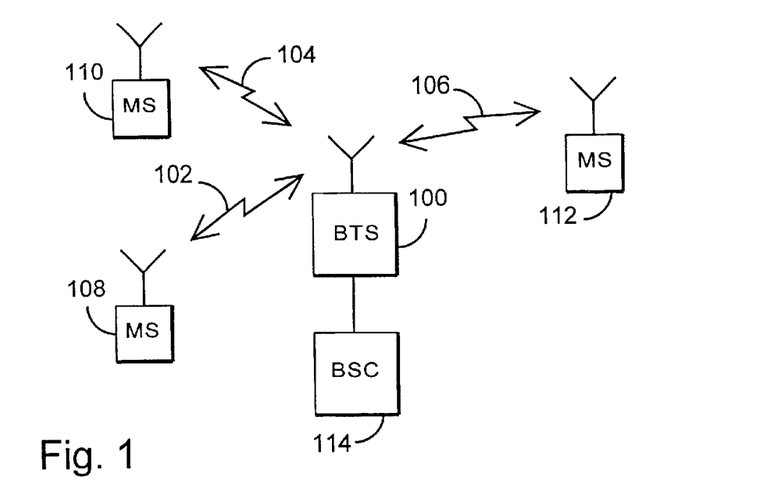
FIG. 1 shows an example of a radio system in accordance with the invention.

FIG. 1 illustrates one digital data transmission system, to which a solution of the invention can be applied. It refers to a part in a cellular radio system which comprises a base station 100 that communicates 102 to 106 bidirectionally with subscriber terminals 108 to 112. The base station further communicates with a base station controller 114 which relays terminal connections elsewhere in the network. The exemplifying digital data transmission system is a cellular radio system, and hereinafter the invention is described as applied to the cellular radio system, however, without restricting thereto in any way, as is obvious to the person skilled in the art. The invention is also applicable to other systems.

Figure 2:
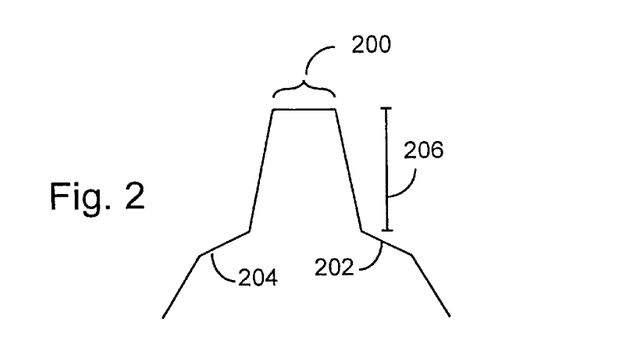
FIG. 2 illustrates a first example of a frequency channel.

FIG. 2 exemplifies one frequency channel of the radio system. In the solution of the invention, the frequency channel may be either broad or narrow. The solution of the invention can be applied to systems employing both types of frequency channels. Most preferably, the invention is applicable to broadband systems. In narrowband systems, on one frequency channel, there is in general one traffic channel, onto which a plurality of traffic channels are possibly time-multiplexed. On a broadband frequency channel, a plurality of traffic channels can be transmitted simultaneously, multiplexed by coding, for instance. GSM which employs TDMA, i.e. time-multiplexed frequency channels, can be given as an example of narrowband systems. Systems utilizing CDMA, i.e. code division multiple access, can be given as an example of broadband systems. Also combinations of these two are possible. In view of the present invention, it is not essential per se, how the traffic on the frequency channels is divided between different users.

A specific width 200 is allocated to a frequency channel. However, due to the non-linearity of transmitters, the transmitted signal spreads onto wider frequency bands because of sidebands 202, 204 which form on the edges. To save frequency resources, the frequency channels have to be placed adjacently, and thus the sidebands cause interference to adjacent frequency channels. The sideband power is often designated as ACP (Adjacent Channel leakage Power) and it is determined by comparing the transmission power of a specific frequency channel 200 with the power leaking to the adjacent channel and the difference 206 between these is a relative ACP. Both powers can be measured with a similar, channel-wide filter.

Figure 3:
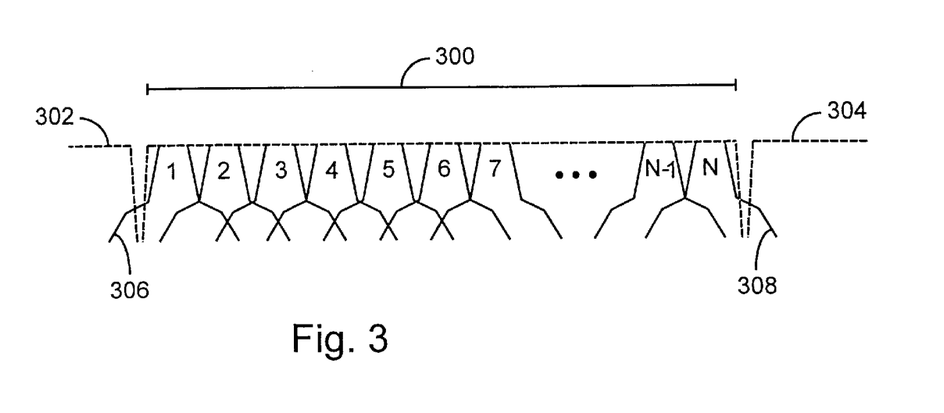
FIG. 3 illustrates an example of the frequency channels of one system.

FIG. 3 illustrates an example of the frequency channels of one system. A specific range 300 of the frequency spectrum is allocated to the system. The allocated range comprises a plurality of frequency channels 1, 2, . . . , N, which are placed adjacently so that the sidebands of adjacent channels overlap. On both sides of the range allocated to the system, there may be frequency ranges 302, 304 allocated to other systems. The sidebands 306, 308 of the outermost channels 1 and N of the system extend outside the frequency range allocated to the system. In order that interference would not occur, the allowed interference level needs to be determined sufficiently low. Adjacent systems may have connections that are sensitive to interference, and consequently a situation may arise, in which the maximum value of the adjacent channel interference allowed to the whole system needs to be determined low because of the outermost channels, even though the inner channels of the system could manage with more permissive values. This drawback is avoided in the solution of the invention, since the maximum value of adjacent channel interference can be determined channel-specifically.

In one preferred embodiment of the invention, the maximum value for adjacent channel interference is determined for each channel at the planning stage of the system. At that stage, comprehensive computer simulations can be carried out by using various power values as parameters, and acceptable values for each channel can be obtained experimentally. In simulations, both the channels of the system concerned and the channels of systems employing adjacent frequency channels can be considered. Thus, in the situation of FIG. 3, stricter limits to adjacent channel interference can be determined for the channels 1 and N than for other channels.

In a second preferred embodiment of the invention, the maximum value of adjacent channel interference is determined for each channel dynamically. A base station monitors traffic loads on various frequency channels and passes the information to a base station controller. On the basis of the traffic loads on various channels the base station controller may infer an acceptable interference level for each channel. The less traffic on the frequency channel, the more interference from the neighbouring channels it tolerates, and correspondingly, when the traffic increases, the capability to tolerate interference decreases. For instance, if the system detects that there is only slightly traffic on the channels 3 and 5 of FIG. 3, the transmitters on the channel 4 can be allowed to transmit with higher adjacent channel interference levels. In addition to the monitoring of traffic load, also other suitable criteria can be applied to the determination of interference level.

In one preferred embodiment of the invention, there is a given, limited number of possible maximum values of adjacent channel interference, and the value of each channel is selected from this number. There may be only two possible values, for instance, and consequently the planning is simple, but the greatest advantage is achieved if there are several values. Typical ACP values used in the cellular radio system may be, for instance, 30 dBc in the centre of the frequency range and 38 dBc on the channels 1 and N as applied to the example of FIG. 3. Naturally, these values are given by way of example only.

Figure 4:
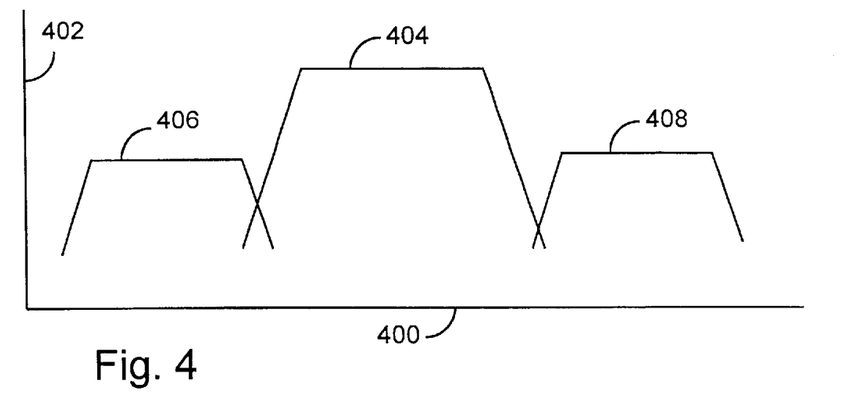
FIG. 4 shows frequency channel allocation in a cellular radio system.

If the invention is applied to the cellular radio system, from the viewpoint of the invention it is not substantial how the channels of the system have been allocated to different cells of the system. FIG. 4 illustrates frequency channel allocation in a system which comprises both micro and macro cells. In the figure, the horizontal axis 400 represents frequency and the vertical axis 402 represents transmission power. In the system, the macro cell frequency channels using higher transmission power are placed in the centre 404 of the frequency range and the micro cell frequency channels using lower transmission power are placed on the edges 406, 408 of the frequency range. In the solution of the invention, maximum values of adjacent channel interference can be set in such a way that the value for the macro cell frequency channels 404 differ from that of the micro cell frequency channels 406, 408.

Figure 5A:
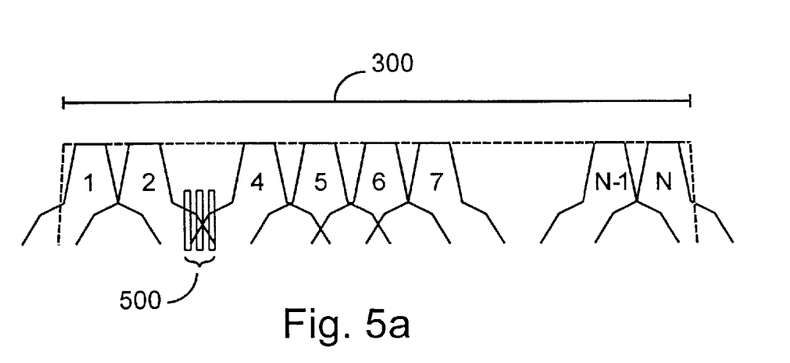
FIGS. 5a and 5b illustrate an example of the frequency channels of one system.

FIG. 5a illustrates another example of the frequency channels of one system. A specific range 300 of the frequency spectrum is allocated to the system. The allocated range comprises a plurality of frequency channels 1, 2, ..., N, which are placed adjacently so that the sidebands of the adjacent channels overlap. The system may have frequency channels of different types, such as broadband and narrowband channels for different purposes. In the example of FIG. 5a, narrowband frequency channels 500 have been allocated in the centre of the frequency range. By means of the solution of the invention the adjacent channel interference of the frequency channels 2 and 4 can be limited to a lower level than in other parts of the frequency range.

Figure 5B:
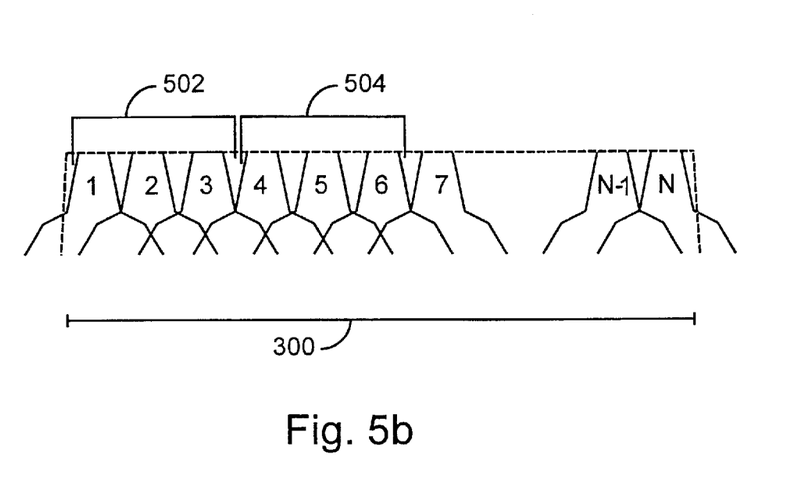

FIG. 5b illustrates an example of the frequency channels of one system. A specific range 300 of the frequency spectrum is allocated to the system. The allocated range comprises a plurality of frequency channels 1, 2, ..., N, which are placed adjacently so that the sidebands of the adjacent channels overlap. Separate frequency channels 504, 506 of the system frequency range are allocated to different operators. Interference between operators can be reduced by limiting the adjacent channel interference of the frequency channels 3 and 4 to a lower level than in other parts of the frequency range.

In a preferred embodiment of the invention, when applying the invention to the cellular radio network a base station controller maintains information on the allowed adjacent channel interference levels of different frequency channels. The base station is arranged to signal the information for the terminal on the maximum value of adjacent channel interference allowed on the frequency channel employed by the terminal. The information on the maximum interference level can be conveyed to the terminal in a variety of ways. For instance, the information can be conveyed every time a call is established, in connection with signalling. For instance, in GSM-based radio systems, the information can be included in a System Information message of the BCCH channel, The base station may also signal information to the terminal on the maximum value of adjacent channel interference allowed on the terminal frequency channel while the terminal is performing a handover onto a new frequency channel. These procedures are applicable in particular when the determination of interference levels is dynamic, i.e. when they vary from time to time.

The base station may also pass the information on the maximum value of interference allowed on each frequency channel every time the terminal registers in the network. This takes place when a terminal that has been switched off is switched on. The base station may signal information to the terminal on the maximum value of interference allowed on each frequency channel, when the terminal registers in the network after a network changeover. These procedures are applicable in particular when the determination of interference levels is static, i.e. when the values are determined at the network planning stage and they do not vary from time to time. The terminal must then have sufficiently storage capacity to keep the allowed power levels of different channels in memory.

With the base station signalling the values to the terminal, an additional advantage is achieved, whereby in the systems of different operators or different countries, different values can be used on different channels, and due to the signalling, the terminal is made aware thereof. If the channel values were the same in all systems, the values could be stored in the memory of the terminal in the manufacturing stage already, and signalling would not be necessary.

The following will study in greater detail, how the amount of power leaking to adjacent channels can be controlled in the transmitter. As described above, the power spreading outside the desired channel mainly results from the nonlinearity of the terminal amplifier. So one way to control the amount of interfering power is to control the amplifier linearity. This can be implemented by adjusting the amplifier biasing. This will be described in greater detail later on in the text.

Another method is to predistort a signal to be transmitted prior to the terminal amplifier to the effect that the predistortion compensates the nonlinearity of the terminal amplifier. This will also be described in greater detail later on in the text.

Figure 6:
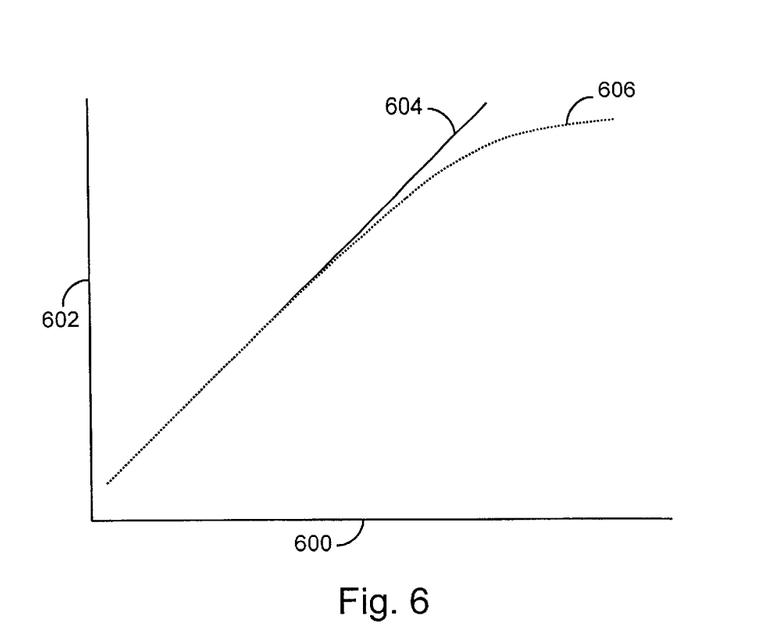
FIG. 6 illustrates output power of one amplifier as a function of input power.

A third method is to control the amount of the transmitter's maximum transmission power. FIG. 6 shows the amplifier's output power as a function of input power. The horizontal axis 600 represents power at the input of the amplifier and the vertical axis 602 represents power at the output of the amplifier. The straight line 604 represents an ideal amplifier which is completely linear. The output power is thus directly dependent on the input power. The graph 606 illustrates the amplifier linearity in practice. As the figure shows, the amplifier remains within the linear area at the lowest values of transmission power, but it is most nonlinear at high power levels, i.e. if the transmission power grows, the nonlinearity grows as well. This is due to the amplifier compression. In practice, this means that by using the same amplifier at different power levels the nonlinearity, and hence also the amount of interference, varies. So, if the maximum power of the transmitter is limited, the nonlinearity can also be reduced, which results in a reduction in interfering power leaking to adjacent channels. For instance, if the maximum transmission power of the transmitter is reduced by 1 dB, the relative ACP may improve by up to 3 dB.

Figure 7:
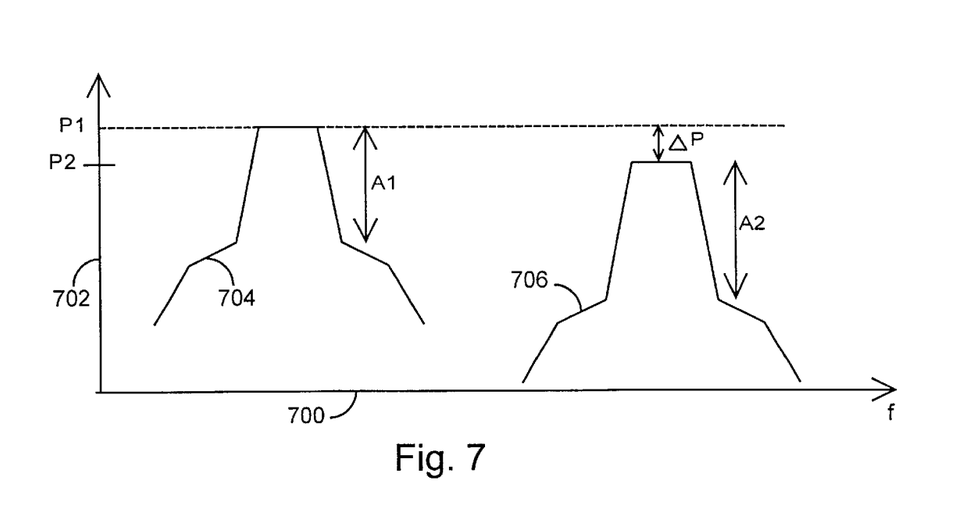
FIG. 7 illustrates an example of a reduction in interference power.

This is illustrated in FIG. 7, which shows an example of two frequency channels of a radio system and the distribution of the transmitter's transmission power onto the channel. In FIG. 7, the horizontal axis 700 represents frequency and the vertical axis 702 represents power at the amplifier output. The left graph 704 illustrates a case in which the transmitter has a given maximum power P1, and the relative ACP has a given value A1. As numerical examples P1=24 dBm and A1=35 dB. The graph 706 on the right illustrates a case in which the maximum transmission power is reduced from value P1 to value P2, so that P1−P2=ΔP. Then the value of the relative APC also changes to value A2, so that A1<A2. As numerical examples P2=20 dBm, i.e. the power has been reduced ΔP=4 dB. A2 is then 41 dB, i.e the relative ACP is improved by 6 dB. The absolute interference level on the adjacent channels hence improves 4+6 dB, i.e. 10 dB.

Figure 8:
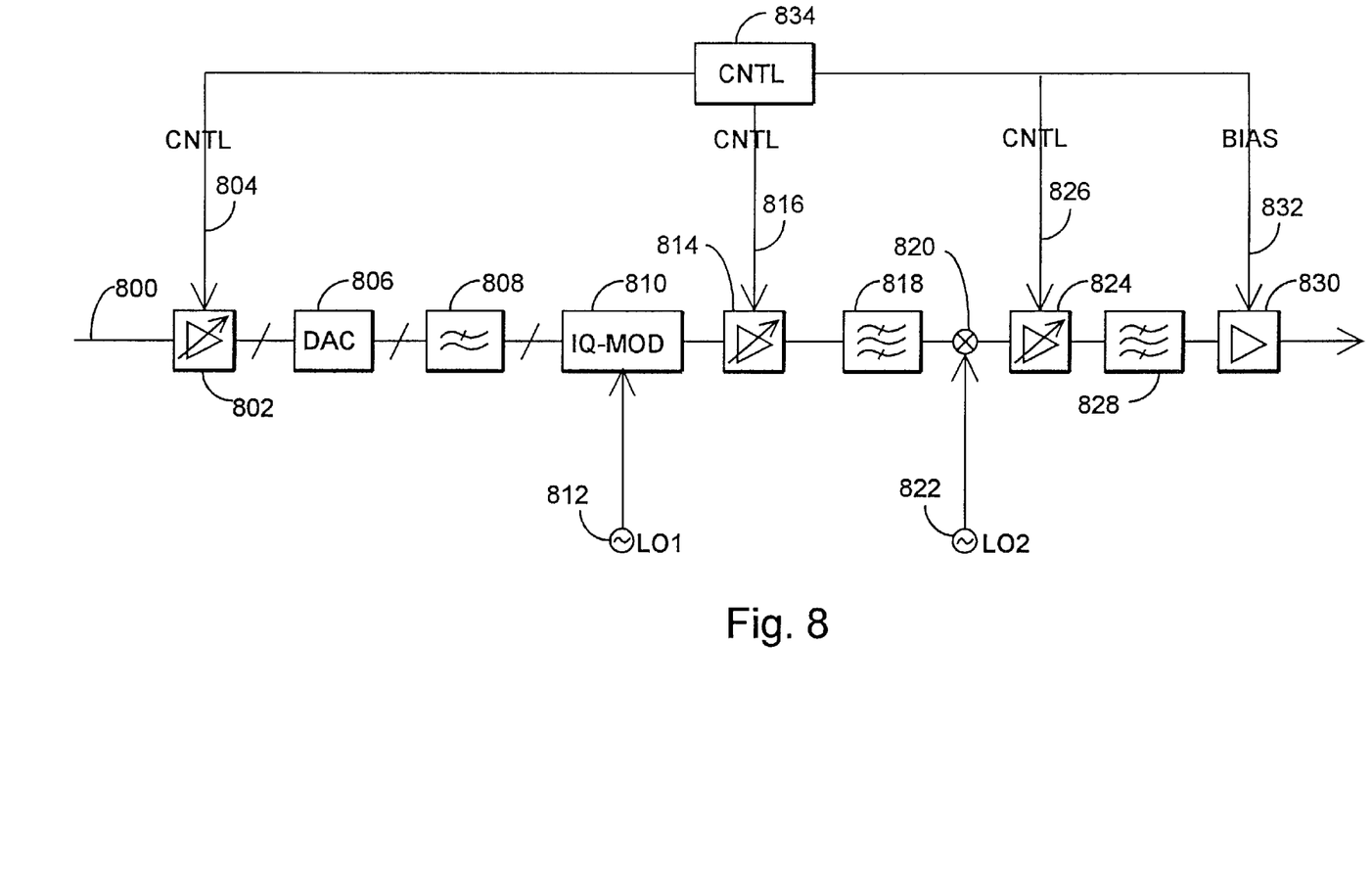
FIG. 8 illustrates an example of a transmitter structure in accordance with the invention.

Next is studied the structure of the transmitter used in the system in accordance with the invention, by means of the block diagram of FIG. 8. In a preferred embodiment of the invention the transmitter is a subscriber terminal when the invention is applied to a cellular radio system, but in accordance with the basic idea of the invention, the transmitter may also be a base station transmitter.

To the transmitter is input a complex signal 800, which consists of two components that are generally known as I and Q components. The complex signal is first input to a first amplifying means 802, to which is also input a control signal 804 from transmitter control means 834. The control signal 804 controls the operation of the amplifying means 802 and defines the gain level. From the first amplifying means the signal is input to digital-to-analogue converters 806, in which the signal to be transmitted is converted into analogue form. The converted analogue signal is input to first filtering means 808, which are typically lowpass filters and in which undesirable components introduced by the digital-to analogue converters 806 are removed from the signal.

The filtered analogue signal, which at this stage still consists of said I and Q components, is next input to an IQ modulator 810, to which an output signal of a first local oscillator 812 is also input. In the modulator the I and Q components are mixed together and modulated with the signal from the local oscillator 812 to the intermediate frequency. The modulated signal is input to second amplifying means 814, in which it is amplified in a manner specified by the control signal 816 from the transmitter control means 834. The control signal 816 may come from the control means 834 through a digital-to-analogue converter (not shown).

The amplified signal at the output of the amplifying means 814 is further input to a second filtering means 818, which is typically a bandpass filter tuned to the intermediate frequency. The filter 818 removes from the signal any undesirable signal components introduced by the modulator 810 and the second amplifying means 816. The output signal of the filter 818 is input to a multiplier 820, in which the signal is multiplied by the radio frequency output signal of a second local oscillator 822. At the output of the multiplier 820, the signal to be transmitted is in radio frequency form and it is input to third amplifying means 824, in which the signal is amplified in a manner specified by the control signal 826 from the transmitter control means 834. The control signal 824 may come from the control means 834 through a digital-to-analogue converter (not shown). The output signal of the amplifying means 824 is input to a third filtering means 828, which is typically a bandpass filter tuned to the radio frequency. The filter 828 removes from the signal any undesirable signal components introduced by the multiplier 820 and the third amplifying means 824.

The output signal of the third filtering means 828 is input to a terminal amplifier 830, which amplifies the signal to be transmitted. The terminal amplifier may comprise one amplifier or a plurality of amplifiers in series. From the output of the terminal amplifier the signal to be transmitted is input through a duplex filter to an antenna (not shown).

In the transmitter in accordance with the invention, the control signal 832 comes from the transmitter control means 834 to the terminal amplifier. Firstly, the control signal comprises bias control, which comes from the control means, for instance, through a digital-to-analogue converter (not shown) and which controls the biasing of the amplifier. Due to the control signal, the linearity of the amplifier can be controlled and thus interference caused to adjacent channels can also be controlled.

In the transmitter of the invention, the maximum power of the transmitter is controlled by adjusting the gain of the second and third amplifying means 814 and 824 with the control signals 816 and 826.

The transmitter control means 834 can be implemented advantageously by means of a processor and necessary software, or separate logic components.

Figure 9:
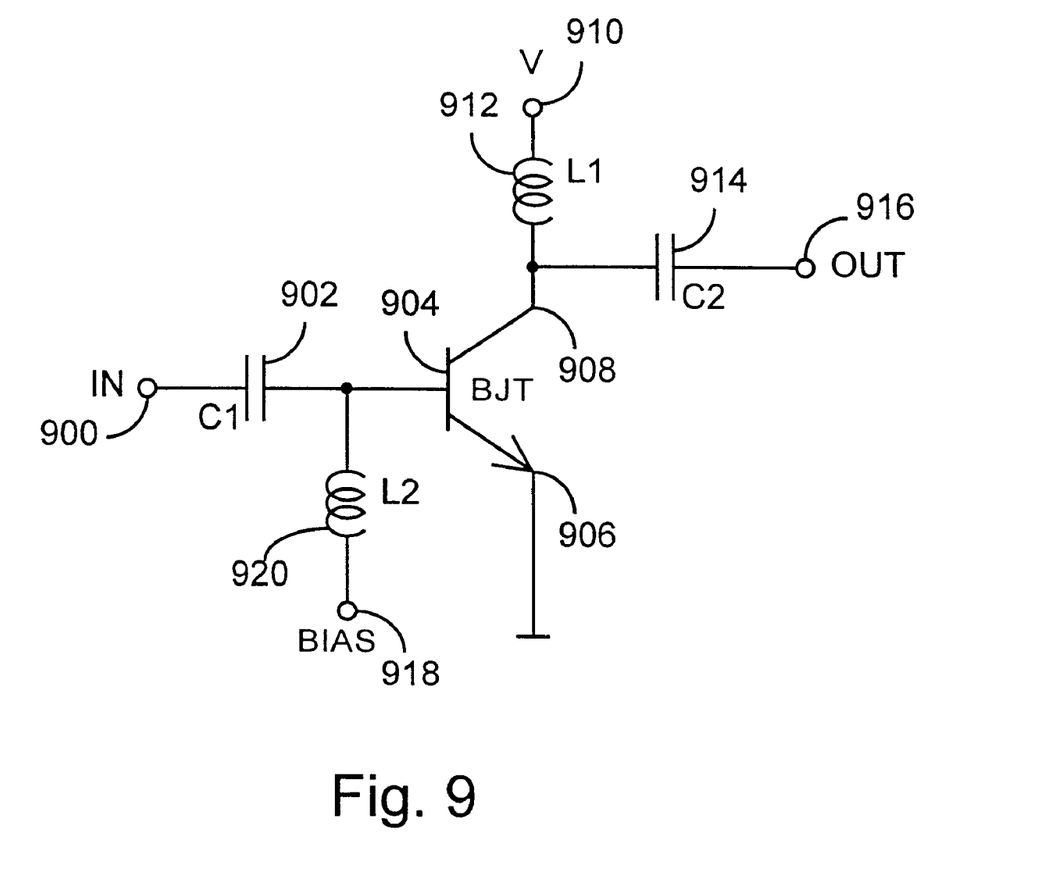
FIG. 9 illustrates a more detailed example of amplifier control.

FIG. 9 illustrates a more detailed example of the implementation of the terminal amplifier bias control. In the example of the figure, the terminal amplifier is implemented by means of a bipolar transistor. The radio frequency signal to be transmitted is at the input 900 of the terminal amplifier. The signal is input through a first capacitor 902 to a bipolar transistor base 904. The transistor emitter 906 is connected to earth potential. Operational voltage is supplied to a transistor collector 908 through a first coil 912. The output signal 916 of the terminal amplifier is received between the first coil 912 and the transistor collector 908 through a second capacitor 914. From the output of the terminal amplifier, the signal to be transmitted is input through the duplex filter to the antenna (not shown). For the sake of clarity, the circuitry solution illustrated herein is simplified and it omits the RF impedance matching components, for instance, as is obvious to the person skilled in the art.

In the solution in accordance with the invention, a biasing signal 918 is input to the terminal amplifier from the control means through the D/A converter, for instance, and the signal is conducted to the transistor base by means of a second coil 920. When bias voltage 918 is increased, the amplifier becomes linear and thus the ACP improves. Correspondingly, with low bias voltage the amplifier is more non-linear and the ACP is lower. Mentioned as a numerical example, the typical transistor working voltage V is 5 volts, and if the bias voltage is half the working voltage, i.e. $V_{BIAS}=V/2$, the amplifier is thus a so-called A class amplifier, i.e. it is as linear as possible.

In practice, the terminal amplifier can naturally be implemented in the transmitter also in other ways than those described above.

Figure 10:
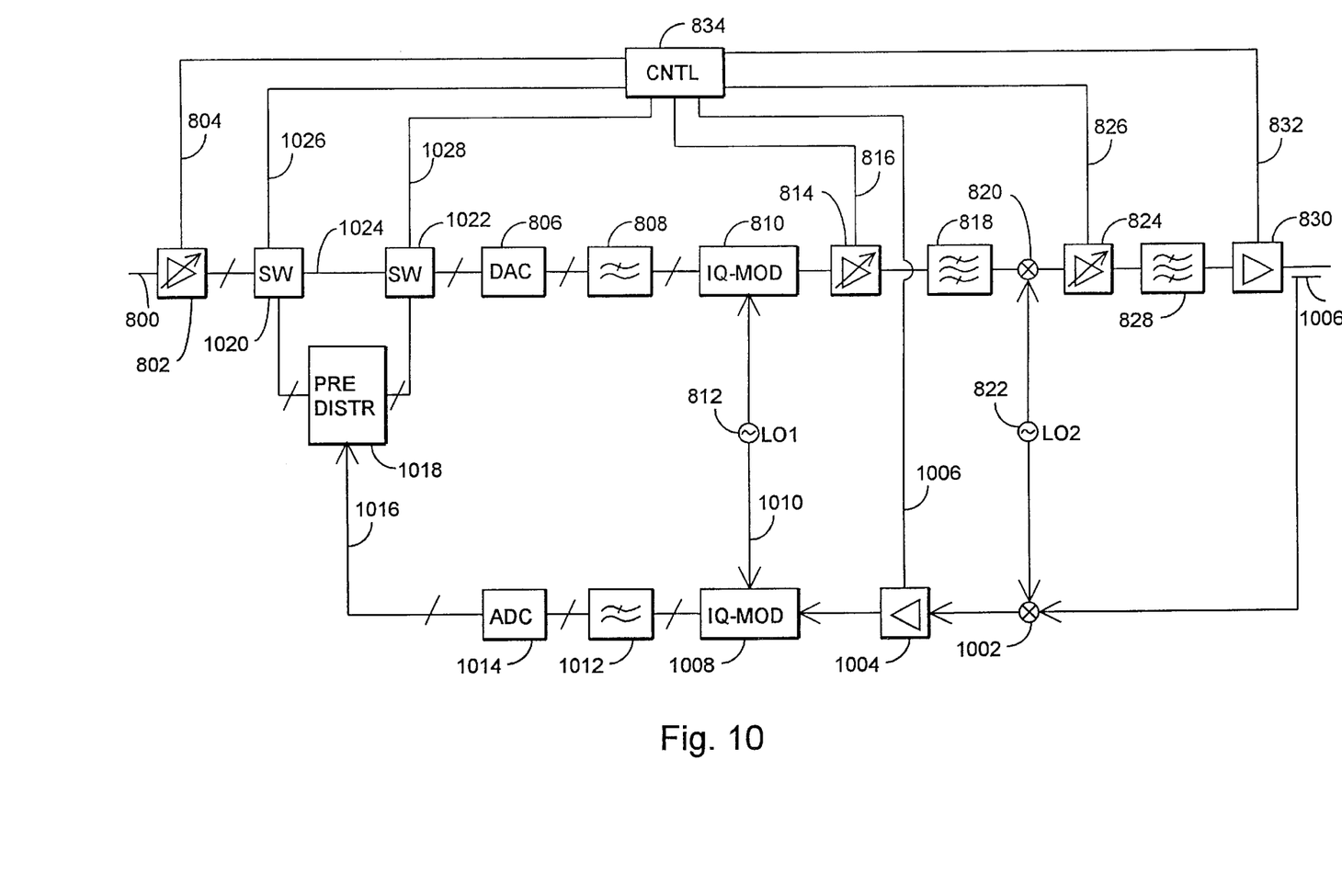
FIG. 10 illustrates a second example of the transmitter structure in accordance with the invention.

Next is studied a second possible structure of the transmitter used in the system in accordance with the invention by means of the block diagram of FIG. 10. This figure particularly illustrates the implementation option, in which the ACP control is performed by adding predistortion to the signal to be transmitted prior to the terminal amplifier. The block diagram of FIG. 10 is for the most part similar to FIG. 8, like reference numerals refer to corresponding components and in the following only components that are relevant to this option are described.

From first amplifying means 802, the signal to be transmitted is input to a first switch 1020. The switch has two positions. In one position the switch 1020 connects the signal to predistortion means 1018. In the other position the switch 1020 connects the signal to bypass 1024 the predistortion means. In the predistortion means 1018, distortion is performed on the signal by means of so-called predistortion factors, and this predistortion compensates the non-linearity assumed by the signal in the terminal amplifier 830. Thus, by means of the predistorter the linearity of the transmitter can be controlled, and consequently also the amount of adjacent channel interference. This will be described in more detail later on in the text.

The output of the predistortion means 1018 is coupled to the input of a second switch 1022, to which input a bypass path 1024 is also coupled. The second switch 1022 operates in syncronization with the first switch 1020 so that, if the first switch has connected the signal to the bypass path 1024, the second switch is also in the bypass position. Correspondingly, if the first switch has connected the signal to the predistortion means 1018, the second switch is also in the predistortion means position. The positions of the first and second switches are controlled by means of the control signals 1026, 1028 provided by the control means 834.

In this implementation, switching means 1000 follow the terminal amplifier on the signal path. In the switching means 1000 a small proportion of the transmission signal power returns through a divider first to the second mutiplier 1002 where the signal is multiplied by the signal of the second local oscillator 822. As a result of the multiplication, the signal is transferred from the radio frequency to the intermediate frequency. The intermediate frequency signal is further input to fourth amplifying means 1004 where the signal is amplified in accordance with the control signal 1006 provided by the control means 834.

The amplifier output signal is input to an IQ demodulator 1008, whereto the first local oscillator 812 signal is also input. In the demodulator the signal is demodulated to the baseband frequency and it comprises I and Q components. From the demodulator the signal is further input to fourth filtering means 1012, which are preferably lowpass filters and which remove from the signal any undesirable components possibly introduced by the second multiplier 1002, the fourth amplifying means 1004 and the demodulator 1008. The filtered signal is input to analogue-to-digital converters 1014, which convert the signal into the digital form. From the converters the digital signal 1016 is input to the predistortion means 1018.

The predistortion means 1018 compare the signal to be transmitted, coming from the first amplifying means, with the transmitted feedback signal 1016 subsequent to the terminal amplifier. The objective is to make these signals mutually identical. On the basis of the comparison, the predistortion means may change the predistortion of the signal to be transmitted, if necessary, by changing predistortion coefficients, which compensates the nonlinearity of the terminal amplifier.

Depending on the frequency channel employed and the ACP value used on the channel, the transmitter control means 834 may connect the signal to the predistortion means by means of the first and second switches 1020, 1022.

The predistortion means 1018 can be implemented in conventional manners known to the person skilled in the art. FIG. 10 illustrates a digital predistorter, but in a corresponding manner the predistorter can also be implemented in analogue form, as is obvious to the person skilled in the art.

The described transmitter solutions are only examples intended to illustrate the invention. As is obvious to the person skilled in the art, in practice, the transmitter details may naturally vary and the transmitters may also comprise other components which have not been described here for the sake of clarity.

Even though the invention is described in the above with reference to the examples of the attached drawings, it is obvious that the invention is not restricted thereto, but it may be modified in a variety of ways within the scope of the inventive idea disclosed in the accompanying claims.

What is claimed is:

1. A radio system comprising a plurality of transceivers that are arranged to communicate with each other by using a plurality of predetermined radio frequency channels, and means for determining a maximum value for an allowed amount of interference caused to adjacent channels by a transmitter of the transceiver, wherein part of the available radio frequency is allocated to narrowband frequency channels and part to broadband frequency channels and wherein the transceivers of the system are arranged to transmit on different radio frequency channels using different maximum values of allowed adjacent channel interference, and the broadband transceivers of the system are arranged to transmit on the frequency channels on the edges of the frequency range allocated to broadband channels by using a first determined maximum value of adjacent channel interference, and on the frequency channels in the center of the frequency range allocated to broadband channels by using a second determined maximum value of adjacent channel interference, and that these determined maximum values are different.

2. A system as claimed in claim 1, wherein a transmitter of the system comprises an amplifier which is arranged to amplify a signal to be transmitted and that the transmitter comprises control means for changing the amount of interference caused to adjacent frequency channels by the transmitter frequency channel by controlling the maximum transmission power of the transmitter.

3. A system as claimed in claim 1, wherein the transmitter of the system comprises the amplifier which is arranged to amplify the signal to be transmitted and that the transmitter comprises control means for changing the amount of interference caused to adjacent frequency channels by the transmitter frequency channel by controlling the linearity of the amplifier.

4. A system as claimed in claim 1, wherein the transmitter of the system comprises an amplifier, which is arranged to amplify the signal to be transmitted, and predistortion means for adding predistortion to the signal to be transmitted prior to the amplifier, and that the transmitter comprises the control means for changing the amount of interference caused to adjacent frequency channels by the transmitter frequency channel by altering the predistortion.

5. A system as claimed in claim 3, wherein the transmitter of the system comprises control means for changing the linearity of the transmitter by controlling the amplifier biasing.

6. A system as claimed in claim 1, comprising at least one base station and a plurality of subscriber terminals, which are arranged to communicate with the base station.

7. A system as claimed in claim 6, wherein the base station is arranged to signal information to the terminal on the maximum value of interference allowed on the transmitter frequency channel every time a call is established.

8. A system as claimed in claim 6, wherein the base station is arranged to signal information to the terminal on the maximum value of interference allowed on each frequency channel every time the terminal registers in the network.

9. A system as claimed in claim 6, wherein the base station is arranged to signal information to the terminal on the maximum value of interference allowed on each frequency channel while the terminal performs handover onto a new frequency channel.

10. A system as claimed in claim 6, wherein the base station is arranged to signal information to the terminal on the maximum value of interference allowed on each frequency channel while the terminal logs in the network after a network changeover.

11. A system as claimed in claim 1 comprising means for monitoring traffic load on the frequency channels and means for determining an acceptable maximum value of interference for each frequency channel on the basis of the load.

12. A system as claimed in claim 1 wherein the acceptable maximum value of interference for each frequency channel is determined at the planning stage of the system.

13. A radio system comprising a plurality of transceivers that are arranged to communicate with each other by using a plurality of predetermined radio frequency channels, and means for determining a maximum value for an amount of interference caused to adjacent channels by a transmitter of the transceiver, wherein the transceivers of the system are arranged to transmit on different radio frequency channels using different maximum values of adjacent channel interference, and the transceivers of the system are arranged to transmit on the frequency channels on the edges of the frequency range allocated to the system by using a first determined maximum value of adjacent channel interference, and on the frequency channels in the center of the frequency range allocated to the system by using a second determined maximum value of adjacent channel interference, and that these determined maximum values are different.

14. A data transmission method, wherein at least one base station transceiver and terminal transceivers communicate by employing a plurality of predetermined radio frequency channels, and the method includes a step of determining a maximum value for an allowed amount of interference caused to adjacent frequency channels by a transmission frequency channel of the transceiver, wherein different maximum values are determined for different frequency channels, wherein the method comprises further steps of allocating part of the available radio frequency band to narrowband frequency channels and part to broadband frequency channels, and operating the transceivers of the system to transmit on different radio frequency channels using different maximum values of adjacent channel interference, wherein the broadband transceivers of the system transmit on the respective frequency channels on the edges of the frequency range allocated to broadband channels by using a first determined maximum value of adjacent channel interference, and transmit on the frequency channels in the center of the frequency range allocated to broadband channels by using a second determined maximum value of adjacent channel interference, and these determined maximum values are different.

15. A method as claimed in claim 14, wherein the amount of interference caused to adjacent frequency channels by the transmitter frequency channel is changed by controlling the maximum value of the transmitter transmission power.

16. A method as claimed in claim 14, wherein the amount of interference caused to adjacent frequency channels by the transmitter frequency channel is changed by controlling the transmitter amplifier bias.

17. A method as claimed in claim 14, wherein the amount of interference caused to adjacent frequency channels by the transmitter frequency channel is changed by controlling simultaneously both the maximum transmission power and the linearity of the amplifier.

18. A method as claimed in claim 14, wherein the signal is predistorted in the transmitter prior to transmission, and that the amount of interference caused to adjacent frequency channels by the transmitter frequency channel is controlled by changing predistortion of the transmitter.

19. A method as claimed in claim 14, wherein the base station signals information to the terminal on the maximum value of interference allowed on the terminal frequency channel every time a call is established.

20. A method as claimed in claim 14, wherein the base station signals information to the terminal on the maximum value of interference allowed on each frequency channel every time the terminal, registers in the network.

21. A method as claimed in claim 14, wherein the base station signals information to the terminal on the maximum value of interference allowed on the terminal frequency channel while the terminal performs handover onto a new frequency channel.

22. A method as claimed in claim 14, wherein the base station signals information to the terminal on the maximum value of interference allowed on each frequency channel while the terminal logs in the network after a network changeover.

23. A method as claimed in claim 14 wherein the maximum value of interference determined for each frequency channel is varied at different instants of time.

24. A method as claimed in claim 23, wherein the traffic on different frequency channels is monitored and the maximum value for the frequency channels is determined on the basis of the traffic load.

25. A method as claimed in claim 14 to wherein the acceptable maximum value for each frequency channel is determined at the planning stage of the system.

26. A data transmission method, wherein at least one base station transceiver and terminal transceivers communicate by employing a plurality of predetermined radio frequency channels, and the method includes a step of determining a maximum value for the amount of interference caused to adjacent frequency channels by a transmission frequency channel of the transceiver, wherein different maximum values are determined for different frequency channels, and the frequency channels on the edges of the available frequency range employ the first determined maximum value of adjacent channel interference, and that the frequency channels in the center of the frequency range employ the second determined maximum value of adjacent channel interference, and that these maximum values are different.

27. A radio system comprising a plurality of transceivers that are arranged to communicate with each other by using a plurality of predetermined radio frequency channels, and means for determining a maximum value for an amount of interference caused to adjacent channels by a transmitter of the transceiver, wherein the available radio frequency channels are allocated to at least two different operators and wherein the transceivers of the system are arranged to transmit on different radio frequency channels using different maximum values of adjacent channel interference, and the transceivers of the system are arranged to transmit on the frequency channels on the edges of the frequency range allocated to each operator by using a first determined maximum value of adjacent channel interference, and on the frequency channels in the center of the frequency range allocated to each operator by using a second determined maximum value of adjacent channel interference, and that these determined maximum values are different.

28. A data transmission method, wherein at least one base station transceiver and terminal transceivers communicate by employing a plurality of predetermined radio frequency channels, and the method includes a step of determining a maximum value for the allowed amount of interference caused to adjacent frequency channels by a transmission frequency channel of the transceiver, wherein different maximum values are determined for different frequency channels, wherein the method comprises further steps of allocating the available radio frequency channels among at least two different operators, and operating the transceivers of the system to transmit on different radio frequency channels using different maximum values of adjacent channel interference, wherein the transceivers of the system transmit on the frequency channels on the edges of the frequency range allocated to each operator by using a first determined maximum value of adjacent channel interference, and on the frequency channels in the center of the frequency range allocated to each operator by using a second determined maximum value of adjacent channel interference, and these determined maximum values are different.

29. A transceiver apparatus in a radio system comprising a plurality of transceivers, and in which system the available radio frequency channels are allocated to at least two different operators, the apparatus being operative:

to communicate with other transceivers by using a plurality of predetermined radio frequency channels, to transmit on different ones of the radio frequency channels by use of different maximum values of adjacent channel interference, to transmit on the frequency channels on the edges of the frequency range allocated to each of said operators by using a first determined maximum value of adjacent channel interference, and on the frequency channels in the center of the frequency range allocated to each of said operators by using a second determined maximum value of adjacent channel interference, and wherein these determined maximum values are different.

30. A method of operating transceiver apparatus in a radio system comprising a plurality of transceivers, and in which system the available radio frequency channels are allocated to at least two different operators, the method comprising steps of:

communicating with other transceivers by using a plurality of predetermined radio frequency channels, and transmitting on different ones of the radio frequency channels by use of different maximum values of adjacent channel interference, wherein said transmitting step includes transmitting on the frequency channels on the edges of the frequency range allocated to each of said operators by using a first determined maximum value of adjacent channel interference, and on the frequency channels in the center of the frequency range allocated to each of said operators by using a second determined maximum value of adjacent channel interference, and wherein these determined maximum values are different.

* * * * *